US010675557B2

(12) United States Patent
Jiang et al.

(10) Patent No.: US 10,675,557 B2
(45) Date of Patent: Jun. 9, 2020

(54) CONTINUOUS CRYSTALLIZATION METHOD UNDER CONTROL OF MULTISTAGE MEMBRANE

(71) Applicant: Dalian University of Technology, Dalian, Liaoning Province (CN)

(72) Inventors: Xiaobin Jiang, Dalian (CN); Guannan Li, Dalian (CN); Gaohong He, Dalian (CN); Linghan Tuo, Dalian (CN); Dapeng Lu, Dalian (CN); Wu Xiao, Dalian (CN); Xiangcun Li, Dalian (CN); Xuemei Wu, Dalian (CN)

(73) Assignee: DALIAN UNIVERSITY OF TECHNOLOGY, Dalian, Liaoning (CN)

( * ) Notice: Subject to any disclaimer, the term of this patent is extended or adjusted under 35 U.S.C. 154(b) by 50 days.

(21) Appl. No.: 16/314,773

(22) PCT Filed: Nov. 3, 2017

(86) PCT No.: PCT/CN2017/109249
§ 371 (c)(1),
(2) Date: Jan. 2, 2019

(87) PCT Pub. No.: WO2019/084897
PCT Pub. Date: May 9, 2019

(65) Prior Publication Data
US 2020/0114277 A1   Apr. 16, 2020

(51) Int. Cl.
*B01D 9/00*   (2006.01)

(52) U.S. Cl.
CPC ......... *B01D 9/0059* (2013.01); *B01D 9/0013* (2013.01); *B01D 9/0054* (2013.01); *B01D 9/0063* (2013.01); *B01D 2009/0086* (2013.01)

(58) Field of Classification Search
CPC ...... B01D 9/00; B01D 9/0059; B01D 9/0013; B01D 9/0054; B01D 9/0063; B01D 2009/0086
See application file for complete search history.

(56) References Cited

FOREIGN PATENT DOCUMENTS

| CN | 103936632 A | 7/2014 |
|----|-------------|--------|
| CN | 106166400 A | 11/2016 |
| CN | 106946656 A | 7/2017 |
| CN | 107233744 A | 10/2017 |

*Primary Examiner* — Edward M Johnson
(74) *Attorney, Agent, or Firm* — Muncy, Geissler, Olds & Lowe, P.C.

(57) ABSTRACT

The present invention provides a continuous crystallization method under control of the multistage membrane modules, and belongs to the technical field of crystallization engineering. A crystallization solution is added to a crystallizer, and a stirring apparatus and a temperature control apparatus are started. After the system running stability, the loop of crystallization is started. Meanwhile, the coolant or antisolvent feed liquid loop is also started. The crystallization solution can respectively conduct crystal nucleation, growth and ripening in the multistage membrane modules, and then the crystallization solution is transported into a filter device and a drying apparatus to obtain the final crystal products. The desired crystal products can be obtained by the systematical control of the nucleation and crystal growth through the flow and the temperature of the crystallization solution, coolant or antisolvent feed liquid, and the contact time between two liquid phases.

3 Claims, 3 Drawing Sheets

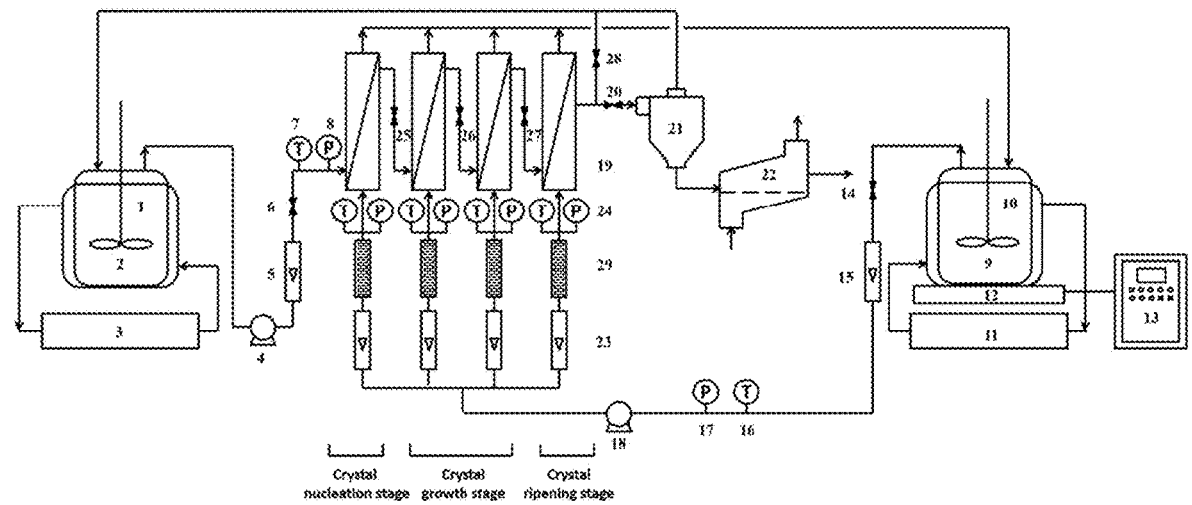
FIG. 1(FIG.1 as an illustration in Abstract)
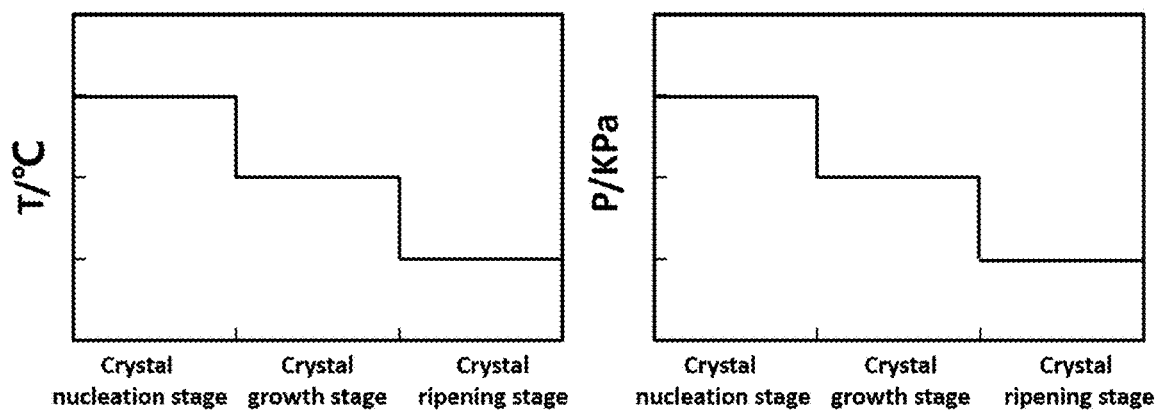
FIG. 2(a)  FIG. 2(b)
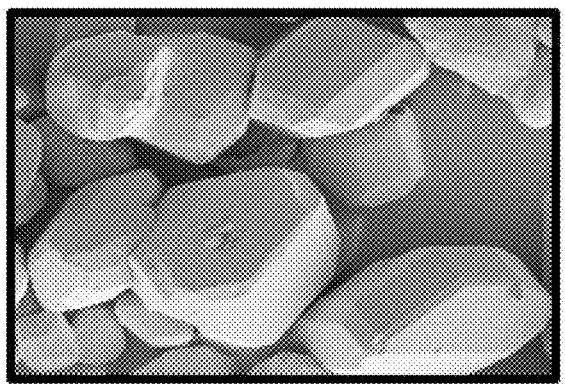 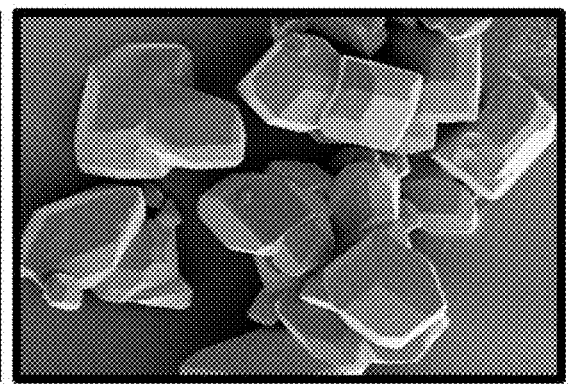
FIG. 3(a)  FIG. 3(b)

CONTINUOUS CRYSTALLIZATION METHOD UNDER CONTROL OF MULTISTAGE MEMBRANE

TECHNICAL FIELD

The present invention belongs to the technical field of crystallization engineering, relates to a continuous crystallization method under control of multistage membrane and is especially suitable for crystal production processes with strict requirements for temperature and concentration control.

BACKGROUND

Crystallization, as a major chemical separation and product preparation technology, is a key generic technology in the chemical, medicine, life, national defense and other fields, and creates huge economic benefits and social value. The control of the crystallization process determines the properties of the product and the separation efficiency, and is the key to the preparation of crystal products with ultra-high purity, specific crystal size and morphology.

Generally speaking, the crystallization process mainly includes three stages: (1) supersaturated state of the solution (or melt), (2) crystal nucleation in supersaturated and metastable systems, and (3) competition between crystal nucleation and growth. The accurate control of the crystallization process is based on the precise control of supersaturated degree of the system, ensured by the accurate judgement of crystal nucleation, and realized by the efficient control of a competition relationship between crystal nucleation and growth.

Currently, the control of the supersaturated degree of a crystallization system is mainly realized through single temperature control (such as cooling crystallization, melt crystallization, etc.) or concentration control (such as antisolvent crystallization, precipitation crystallization, etc.). However, the control interface is small and insufficient, which inevitably brings about low micromixing efficiency, uneven local supersaturated degree and uncontrollable burst nucleation caused by the difference in mass transfer rates, thereby seriously limiting the control accuracy of the crystallization process. Therefore, a new control technology is required to be developed to improve the controllability and adjustability of the crystallization process.

For example, cooling crystallization is a typical crystallization technology that produces the supersaturated degree by reducing solution temperature. In order to shorten the crystallization period, prevent the burst nucleation, effectively control crystal growth and obtain a crystal product with uniform size, a proper quantity of seed crystals with appropriate size are usually added into the solution, so that solutes can only grow on the surface of the seed crystals. It is necessary for the crystal seed to suspend in the solution system uniformly without agglomerate by selecting proper stirring; meanwhile, the secondary nucleation is avoided as much as possible. The temperature and the concentration of the solution must be precisely controlled throughout the crystallization process. Generally, desired seed crystals shall be the same crystals with relatively complete structures and components obtained in the same precipitation system, and high purity as well. However, the quantity, size, and pretreatment of crystal seed and the time of the addition have certain effects on final product quality. In the current crystal production, the addition of crystal seeds is based on the experience, and there is no theoretical and experimental basis for quantity and size of the adding seed crystals and the temperature of addition.

Chinese patents CN1736970A and CN102070625A mention that the crystal products that meet the requirements can be obtained by adding the seed crystals. However, in order to obtain the crystal products that meet the requirements, the quality and size of the seed crystals and the time of addition are strictly required in the control conditions. Once operating conditions are deviated, the quality of the crystal products will be affected. Therefore, it is very limited to produce different crystals with different sizes by using this method and it is also difficult to expand the production.

Antisolvent crystallization is a technology that generates the supersaturated degree by by gradually adding an antisolvent into the solution. The added antisolvent may be gas or liquid. In the process of antisolvent crystallization, dropping the antisolvent will result in high supersaturated degree at the addition point, and a large number of crystal nucleuses will be produced and agglomeration. Furthermore, the produced crystal nucleuses often contain mother liquid, which affects the quality of the crystal products. In the current industrial process, there are two ways of adding the antisolvent, namely, a dropwise stirring way and a novel jet way. In the dropwise stirring way, the diffusion rate of antisolvent droplets is limited, and the burst nucleation is easily happened because of the supersaturation level of the addition point is much higher than that of other places. At the same time, a large number of primary crystal nucleuses containing the mother liquid are produced, resulting in too wide crystal size distribution and the decrease of the product quality. Although the novel jet way improves the defect of uneven mixing to a certain extent, formed crystal structures have serious defects. In addition, high turbulence intensity will result in more crystal nucleation and low growth rate.

Chinese patents CN021152070.4, 200610165255.9, 201210594123.3 and 201310694016.2 mention that the drugs and biological macromolecular crystal products that meet the requirements can be prepared by antisolvent crystallization. However, the antisolvent crystallization mentioned in the patents is the dropwise stirring production process, which has poor control over the operation conditions and is difficult to expand the production; and the types of the crystals produced are also very limited. Moreover, in the patents, the optimization of the antisolvent crystallization is more about the improvement of the pretreatment of the crystallization solution, rather than the major production link of the antisolvent crystallization. Thus, the improvement of the quality of crystal products is very limited.

With the continuous development of membrane materials and science, the membrane has been widely used in various fields. Researchers have developed a variety of membrane separation processes for different industrial needs. In addition, membrane separation technologies are crossed, integrated and innovated with other technologies to give full play to the advantages of the membrane separation processes and make the industrial process more complete. The present invention establishes a continuous crystallization method and system based on control of a multistage membrane structure to obtain desired crystal products through the selection and modification of the membranes the control over the operation conditions, which uses membranes as heterogeneous nucleation surface, as well as the highly uniform dispersion control interfaces of temperature and concentration, and which gives full play to the advantages of the membrane materials and membrane modules in high precision control of the interface temperature and mass transfer process, The present invention is used for the preparation of medical, biological macromolecule and chemical products, and can greatly expand the application fields of cooling crystallization and antisolvent crystallization.

SUMMARY

The present invention proposes a continuous crystallization method under control of multistage membrane. Membrane surface is used as a nucleation interface and an antisolvent dispersion interface. Multistage membrane modules can be classified into a crystal nucleation stage, a crystal growth stage and a crystal optimized stage according to different functions. Under the action of the nucleation interface, all the membranes inside the membrane modules are evenly distributed, and the crystallization solution and auxiliary control solution flow on both sides of the membrane, respectively. In the cooling crystallization process, the auxiliary control solution is a low-temperature liquid. Because of the temperature difference between cooling liquid and crystallization solution, the crystallization solution reaches a supersaturated degree on the surface of the membrane to nucleate. The crystal nucleus is taken away from the membrane surface under the action of fluid shear force, and then continues to grow. In the antisolvent crystallization process, crystallization solution and antisolvent flow on the both sides of the membrane. The antisolvent permeates into the crystallization solution side across the membrane through the control of the membrane materials and the difference of solution concentration, temperature and pressure across the membrane. When the crystallization reaches to the supersaturated degree, the crystal nucleus is produced. The membrane materials and operating conditions are used to control the heat exchange capacity and the addition volume of the antisolvent, so as to control the crystal size distribution and the morphology. The mixing solution carried the desired crystals enter into a filter device for continuously preparing the crystal product.

The Present Invention Adopts the Following Technical Solution:

A continuous crystallization method under control of multistage membrane is provided. A used continuous crystallization apparatus is formed by two loops;

a first loop: a first stirring apparatus 2 is installed in a raw material kettle 1 with a jacket; the jacket is connected with a first temperature control apparatus 3 through a pipeline; an outlet of the crystallizer 1 is connected with a lower outlet of a first membrane module in a membrane module combination 19 successively through a first peristaltic pump 4, a first rotameter 5, a first valve 6, a first thermometer 7 and a first pressure gauge 8; one path of an upper outlet of a last membrane module in the membrane module combination 19 is connected with an inlet of the crystallizer 1 through a seventh valve 28, wherein the connection of the membrane modules is controlled by the valves; another path of the upper outlet of the last membrane module in the membrane module combination 19 is connected with a filter device 21 through a third valve 20; an upper outlet of the filter device 21 is connected with an inlet of the crystallizer 1, and a lower outlet of the filter device 21 is connected with a left outlet of a drying apparatus 22; a right outlet of the drying apparatus 22 produces the final crystal product; a lower outlet of the drying apparatus 22 is a dry gas inlet, and an upper outlet of the drying apparatus 22 is a drying apparatus outlet;

a second loop: a second stirring apparatus 9 is installed in a coolant or antisolvent feed liquid tank 10 with a jacket; the jacket is connected with a second temperature control apparatus 11 through a pipeline; the coolant or antisolvent feed liquid tank 10 is placed on a precision electronic balance 12; the precision electronic balance 12 is connected with a control system 13; an outlet of the coolant or antisolvent feed liquid tank 10 is connected with an inlet of the coolant or antisolvent feed liquid tank 10 successively through a second valve 14, a second rotameter 15, a second thermometer 16, a second pressure gauge 17, a second peristaltic pump 18, a rotameter combination 23, a temperature regulator combination 29, a meter combination 24 and a membrane module combination 19, wherein a lower outlet of each membrane module is connected with a temperature regulator through the pressure gauge and the thermometer; a lower outlet of each temperature regulator is connected with a rotameter and then is connected in parallel and connected in series in the loops;

steps are as follows:

(1) preparing a nearly saturated crystallization solution, and transporting into a raw material kettle 1; starting the first stirring apparatus 2 and the first temperature control apparatus 3 to uniformly mix the crystallization solution simultaneously starting the second stirring apparatus 9, the second temperature control apparatus 11, the precision electronic balance 12 and the control system 13 to uniformly heat the antisolvent and keep a stable balance reading;

(2) starting the first peristaltic pump 4, the first valve 6 and the membrane module combination 19; adjusting the first peristaltic pump 4, and enabling the crystallization solution to stably flow in the first loop;

(3) opening the second valve 14; starting the second peristaltic pump 18 to enable liquid in the coolant or antisolvent feed liquid tank 10 to circularly and stably flow in the second loop; controlling the temperature of the coolant in the membrane modules tube pass by adjusting the power of the temperature regulators of all stages to enable the temperature of all stages in the membrane module combination to be as shown in the left figure in FIG. 2, and wherein the temperature of a nucleation region is higher than that of a growth region by 2-20° C. and the temperature of the growth region is higher than that of a ripening region by 1-10° C.; controlling the flow velocity of antisolvent in the membrane modules shell pass by adjusting the rotameters of all stages to enable the pressure of all stages in the membrane module combination to be as shown in FIG. 2 so as to adjust the permeation rate of the shell pass antisolvent, wherein the pressure of the nucleation region is higher than that of the growth region by 2-20 kPa and the pressure of the growth region is higher than that of the ripening region by 1-10 kPa; the residence time of the crystallization solution in the nucleation region, the growth region and the ripening region increased gradually; respectively conducting crystal nucleation process, crystal growth process and crystal optimized process; controlling the residence time of all the stages according to shapes required for the design;

(4) until the circularly flowing crystal product in the first loop meets requirements, closing the seventh valve 28, opening the third valve 20, the filter device 21 and the drying apparatus 22 and introducing dry gas to obtain the final crystal product at the outlet of the dry apparatus 22.

The membrane module may use the hollow fiber membrane or the flat membrane. Organic membranes such as PTFE (polytetrafluoroethylene), PVDF (polyvinylidene fluoride), PE (polyethene) and PP (polypropylene), inorganic membranes such as metallic oxide membranes and zeolite membranes, and composite membranes such as polyvinyl alcohol/micro-nano cellulose can be used.

The present invention has the following beneficial effects that:

(1) Crystal sizes are controllable, and the crystal size distribution is narrow. The present invention produces the crystal nucleus and controls the antisolvent distribution under the control of membrane, so as to effectively control the nucleation rate and avoid the burst nucleation. The multistage membrane modules can be used as the crystal nucleation stage, the crystal growth stage and the crystal optimized stage, respectively, so as to effectively control crystal growth and obtain crystal products with uniform sizes.

(2) The process is easy to control and convenient to operate. The present invention can realize transfer liquid of shell and tube pass in the membrane modules through valve control. The nucleation and the crystal growth can be controlled by regulating liquid temperature and flow velocity on both sides of membrane. Compared with the cooling crystallization technology of adding the seed crystal, the present invention avoids the processing and selecting the seed crystal and selecting the conditions for adding seed crystal. Compared with the dropwise antisolvent crystallization technology, the present invention avoids adding other devices to improve the mixed state of the antisolvent and the solution.

(3) The application range is wide, and the operation conditions are easy to change. The present invention proposes a novel crystallization technology under control of the multistage membrane, avoids agglomeration and crush of the seed crystal in the crystallization solution, and obtains the desired crystal product by controlling feed liquid flow velocity, the temperature difference, the pressure difference and the supersaturated degree. The present invention extends the application ranges of the cooling crystallization technology and the antisolvent crystallization technology.

DESCRIPTION OF DRAWINGS

FIG. 1 is an apparatus schematic diagram of a continuous crystallization method under control of a multistage membrane.

FIG. 2(a) is a temperature change diagram of all stages in the multistage membrane module.

FIG. 2(b) is a pressure change diagram of all stages in the multistage membrane module.

FIG. 3(a) is a diagram of an erythritol crystal product obtained under control of single-stage membrane.

FIG. 3(b) is a diagram of an erythritol crystal product obtained under control of multistage membrane.

Figure 4:
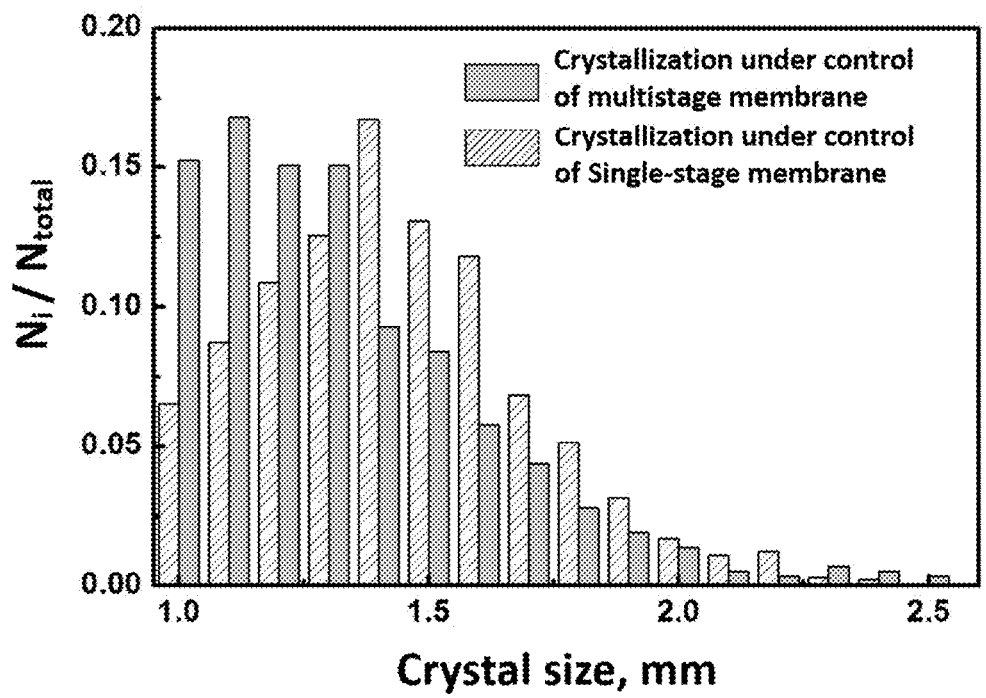
FIG. 4 is a comparison diagram of crystal length-diameter ratio distribution of erythritol crystal products obtained under control of single-stage membrane and multistage membrane.

In the figures: 1 raw material kettle; 2 first stirring apparatus; 3 first temperature control apparatus; 4 first peristaltic pump;

5 first rotameter; 6 first valve; 7 second thermometer; 8 first pressure gauge; 9 second stirring apparatus; 10 coolant or antisolvent feed liquid tank; 11 second temperature control apparatus;

12 precision electronic balance; 13 control system; 14 second valve; 15 second rotameter;

16 second thermometer; 17 second pressure gauge; 18 second peristaltic pump; 19 membrane module combination;

20 third valve; 21 filter device; 22 drying apparatus; 23 rotameter combination;

24 meter combination; 25 fourth valve; 26 fifth valve; 27 sixth valve;

28 seventh valve; and 29 temperature regulator combination.

DETAILED DESCRIPTION

Specific embodiments of the present invention are further described below in combination with accompanying drawings and the process solution.

Embodiment 1

Crystallization Process Under Control of Multistage Membrane:

Using the PES hollow fiber membrane to make a multistage membrane module; preparing the saturated aqueous solution of erythritol at 25° C. and adding the saturated aqueous solution to a raw material kettle 1; starting a first stir apparatus 2 starting a first temperature control apparatus 6, and setting the temperature as 25° C. starting circulating water; maintaining an operating state for 1.5 h; simultaneously, adding absolute ethyl alcohol at 25° C. to a coolant or antisolvent feed liquid tank 10; starting a second temperature control apparatus 11, and setting the temperature as 25° C.; starting a second stirring apparatus 9, a second peristaltic pump 18, a precision electronic balance 12 and a control system 13 to enable the absolute ethyl alcohol circularly and stably flowing in a second loop; after operating for 0.5 h, starting a first peristaltic pump, and opening a first valve 14 and valves 25, 26, 27, 28 to enable the erythritol aqueous solution to circularly and stably flow in a first loop; adjusting the rotational speed of the first peristaltic pump so that the flow of the first loop is 240 ml/min; adjusting the rotational speed of the second peristaltic pump so that the flow of the second loop is 180 ml/min; adjusting the rotameters of the crystal nucleation stage, the crystal growth stage and the crystal optimized stage so that the flows of three stages are respectively 240 ml/min, 90 ml/min and 30 ml/min and corresponding pressures are respectively 8 kPa, 3 kPa and 1 kPa; after stabilizing for 3 h, closing the valve 28, opening the valve 20, the filter device 21 and the drying apparatus 22; and introducing dry gas to obtain erythritol crystal at a drying apparatus outlet.

Crystallization Process Under Control of Single-Stage Membrane:

Using the PES hollow fiber membrane to make a single-stage membrane module; preparing the saturated aqueous solution of erythritol at 25° C., and adding the saturated aqueous solution to a raw material kettle 1; starting a first stir apparatus 2; starting a first temperature control apparatus 6, and setting the temperature as 25° C. starting circulating water; maintaining an operating state for 1.5 h; simultaneously, adding absolute ethyl alcohol at 25V to a coolant or antisolvent feed liquid tank 10; starting a second temperature control apparatus 11, and setting the temperature as 25V; starting a second stirring apparatus 9, a second peristaltic pump 18, a precision electronic balance 12 and a control system 13 to enable the absolute ethyl alcohol circularly and stably flowing in a second loop; after operating for 0.5 h, starting a first peristaltic pump, and opening a first valve 14 to enable the aqueous solution of erythritol to circularly and stably flow in a first loop; adjusting the rotational speed of the first peristaltic pump so that the flow of the first loop is 240 ml/min; adjusting the rotational speed of the second peristaltic pump so that the flow of the second loop is 180 ml/min; adjusting the rotameter connected with the single-stage membrane module so that the flow of the single-stage membrane module is 120 ml/min and corresponding pressure is 4 kPa; after stabilizing for 3 h, closing the valve 28, starting the valve 20, the filter device 21 and the drying apparatus 22; and introducing dry gas to obtain erythritol crystal at a drying apparatus outlet.

It can be seen from FIG. 3 and FIG. 4 that, compared with the antisolvent crystallization under control of single-stage membrane, the crystallization under control of multistage membrane can accurately control crystal nucleation and growth, can effectively distinguish the crystal nucleation stage and the crystal growth stage in the multistage membrane module, and efficiently control the competition relationship between the crystal nucleation and the crystal growth, the surface of the obtained erythritol crystal is smoother, and length-diameter ratio distribution is more centralized.

Embodiment 2

Crystallization Process Under Control of Multistage Membrane:

Using the PTFE hollow fiber membrane to make a multistage membrane module; preparing the saturated aqueous solution of $KNO_3$ at 40° C., and adding the saturated aqueous solution to a raw material kettle 1; starting a first stir apparatus 2; starting a first temperature control apparatus 6, and setting the temperature as 60° C.; starting circulating water; maintaining an operating state for 2 h; simultaneously, adding ultrapure water at 30° C. to a coolant or antisolvent feed liquid tank 10; starting a second temperature control apparatus 11, and setting the temperature as 30° C.; starting a second stirring apparatus 9, a second peristaltic pump 18, a precision electronic balance 12 and a control system 13 to enable the ultrapure water circularly and stably flowing in a second loop; after operating for 1 h, starting a first peristaltic pump, and opening a first valve 14 and valves 25, 26, 27, 28 to enable the aqueous solution of $KNO_3$ to circularly and stably flow in a first loop; adjusting the rotational speed of the first peristaltic pump as 120 ml/min and the rotational speed of the second peristaltic pump as 120 ml/min; adjusting the power of the temperature regulator of the crystal nucleation stage, the crystal growth stage and the crystal optimized stage so that the outlet temperatures of three stages are respectively 30° C., 20° C. and 10° C.; after stabilizing for 1.5 h, closing the valve 28, starting the valve 20, the filter device 21 and the drying apparatus 22; and introducing dry gas to obtain $KNO_3$ crystal at a drying apparatus outlet.

Crystallization Process Under Control of Single-Stage Membrane:

Using the PTFE hollow fiber membrane to make a single-stage membrane module; preparing the saturated aqueous solution of $KNO_3$ at 40° C., and adding the saturated aqueous solution to a raw material kettle 1; starting a first stir apparatus 2; starting a first temperature control apparatus 6, and setting the temperature as 60V; starting circulating water; maintaining an operating state for 2 h; simultaneously, adding ultrapure water at 30° C. to a coolant or antisolvent feed liquid tank 10; starting a second temperature control apparatus 11, and setting the temperature as 30° C.; starting a second stirring apparatus 9, a second peristaltic pump 18, a precision electronic balance 12 and a control system 13 to enable the ultrapure water circularly and stably flowing in a second loop; after operating for 1 h, starting a first peristaltic pump, and opening a first valve 14 to enable the aqueous solution of $KNO_3$ to circularly and stably flow in a first loop; adjusting the rotational speed of the first peristaltic pump as 120 ml/min and the rotational speed of the second peristaltic pump as 120 ml/min; adjusting the power of the temperature regulator connected with the single-stage membrane module so that the single-stage outlet temperature is 20V; after stabilizing for 1.5 h, closing the valve 28, starting the valve 20, the filter device 21 and the drying apparatus 22; and introducing dry gas to obtain $KNO_3$ crystal at a drying apparatus outlet.

Figures 5A, 5B:
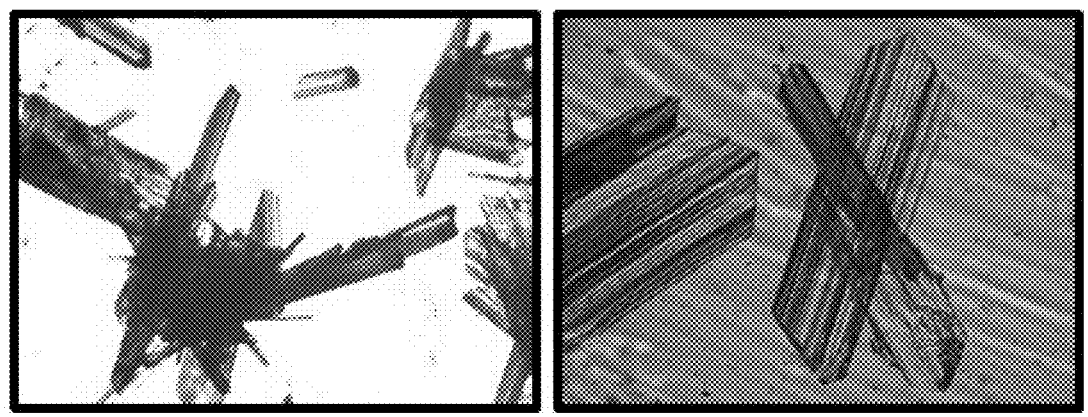
FIG. 5(a) is a diagram of a $KNO_3$ crystal product obtained under control of single-stage membrane.
FIG. 5(b) is a diagram of a $KNO_3$ crystal product obtained under control of multistage membrane.
Figure 6:
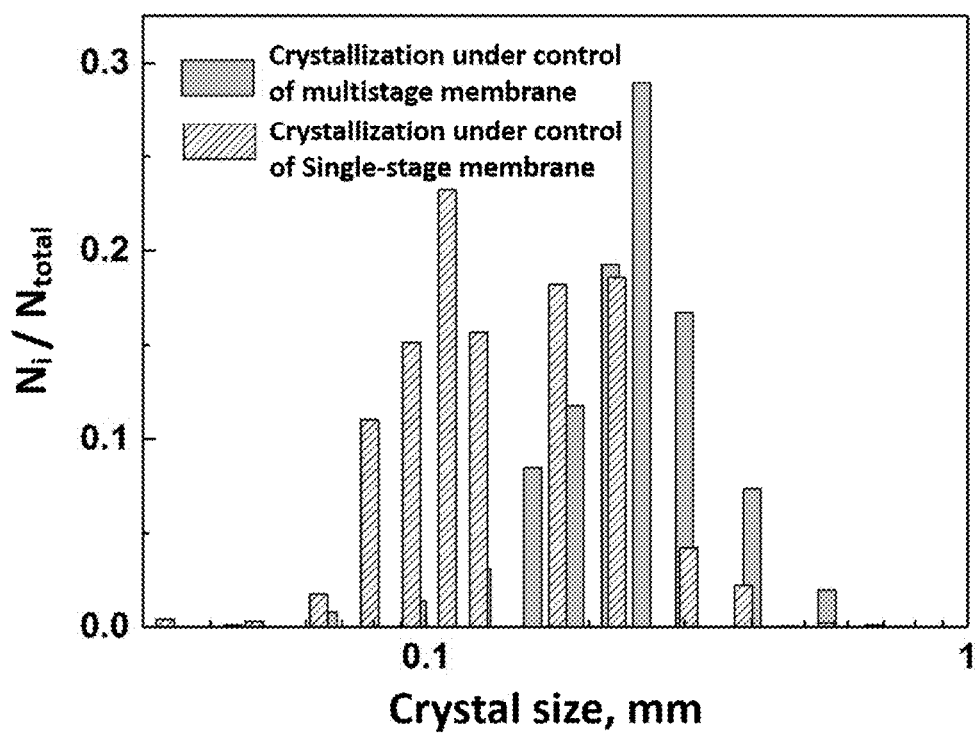
FIG. 6 is a comparison diagram of crystal size distribution of $KNO_3$ crystal products obtained under control of a single-stage membrane and multistage membrane.

It can be seen from FIG. 5 and FIG. 6 that, cooling crystallization under control of single-stage membrane adopts single temperature control, and inevitably has low micromixing efficiency caused by the difference in mass transfer rates. Thus, the control accuracy of the crystallization process is low, and the obtained $KNO_3$ crystal is acicular and piecemeal. The cooling crystallization under control of multistage membrane can effectively control the nucleation rates in the nucleation stage, provide proper supercooling degree in the growth stage for the crystal to grow quickly, efficiently adjust the competition relationship between the crystal nucleation and growth, and enhance process controllability and adjustability, the surface of the obtained $KNO_3$ crystal is smoother, and crystal size distribution is more centralized.

We claim:

1. A continuous crystallization method under control of multistage membrane, wherein a continuous crystallization apparatus is composed by two loops;
   a first loop: a first stirring apparatus is installed in a crystallizer with a jacket; the jacket is connected with a first temperature control apparatus through a pipeline; an outlet of the crystallizer is connected with a lower port of a first membrane module in a membrane module combination successively through a first peristaltic pump, a first rotameter, a first valve, a first thermometer and a first pressure gauge; one path of an upper port of a last membrane module in the membrane module combination is connected with an inlet of the crystallizer through a seventh valve; another path of the upper port of the last membrane module in the membrane module combination is connected with a filter device through a third valve; an upper port of the filter device is connected with an inlet of the crystallizer, and a lower port of the filter device is connected with a left port of a drying apparatus; a right port of the drying apparatus produces the final crystal product; a lower port of the drying apparatus is a dry gas inlet, and an upper port of the drying apparatus is a drying apparatus outlet, wherein the connection of the membrane modules is controlled by the valves;
   a second loop: a second stirring apparatus is installed in a coolant or antisolvent feed liquid tank with a jacket; the jacket is connected with a second temperature control apparatus through a pipeline; the coolant or antisolvent feed liquid tank is placed on a precision electronic balance; the precision electronic balance is connected with a control system; an outlet of the coolant or antisolvent feed liquid tank is connected with an inlet of the coolant or antisolvent feed liquid tank successively through a second valve, a second rotameter, a second thermometer, a second pressure gauge, a second peristaltic pump, a rotameter combination, a temperature regulator combination, a meter combination and a membrane module combination, wherein a lower port of each membrane module is connected with a temperature regulator through the pressure gauge and the thermometer; a lower port of each temperature regulator is connected with a rotameter and then is connected in parallel and connected in series in the loops;

steps are as follows:
(1) preparing the nearly saturated crystallization solution, and transporting into a raw material kettle; opening the first stirring apparatus and the first temperature control apparatus to uniformly mix the crystallization solution; simultaneously opening the second stirring apparatus, the second temperature control apparatus, the precision electronic balance and the control system to uniformly heat the antisolvent and keep a stable balance reading;
(2) opening the control valves in the first peristaltic pump, the first valve and the membrane module combination; adjusting the first peristaltic pump to enable the crystallization solution to stably flow in the first loop;
(3) opening the second valve; starting the second peristaltic pump to enable liquid in the coolant or antisolvent feed liquid tank to circularly and stably flow in the second loop; controlling the temperature of the coolant in the membrane modules tube pass by adjusting the power of the temperature regulators of all stages to cool the stages of the membrane modules, wherein the temperature of the nucleation region is higher than that of the growth region by 2-20° C. and the temperature of the growth region is higher than that of the ripening region by 1-10° C.; controlling the flow velocity of antisolvent in the membrane modules shell pass by adjusting the rotameters of all stages to reduce the pressure of all stages in the membrane module combination so as to adjust the permeation rate of the shell pass antisolvent, wherein the pressure of the nucleation region is higher than that of the growth region by 2-20 kPa and the pressure of the growth region is higher than that of the curing region by 1-10 kPa; the residence time of the crystallization solution in the nucleation region, the growth region and the ripening region; respectively conducting crystal nucleation process, crystal growth process and crystal ripening process;
(4) until the circularly flowing crystal product in the first loop meets requirements, closing the seventh valve, opening the third valve, the filter device and the drying apparatuses and introducing dry gas to obtain the final crystal product at the outlet of the dry apparatus.

2. The continuous crystallization method according to claim 1, wherein the membrane used in the membrane module is the hollow fiber membrane or the flat membrane.

3. The continuous crystallization method according to claim 1, wherein the hollow fiber membrane or/and the flat membrane are organic membranes, inorganic membranes or composite membranes.

* * * * *